United States Patent [19]
Moore

[11] Patent Number: 5,464,543
[45] Date of Patent: Nov. 7, 1995

[54] RAPID GRAVITY FILTER BACKWASH SYSTEM AND FILTERS RELATIVE THERETO

[76] Inventor: Richard P. Moore, P O Box 471, Germiston, 1400, Transvaal, South Africa

[21] Appl. No.: 136,912

[22] Filed: Oct. 18, 1993

[30] Foreign Application Priority Data

Oct. 16, 1992 [ZA] South Africa .............................. 92/7982

[51] Int. Cl.⁶ ................................................... B01D 24/42
[52] U.S. Cl. .................... 210/794; 210/274; 210/275; 210/293; 210/793; 210/797; 210/798
[58] Field of Search ..................................... 210/275, 274, 210/264, 265, 791, 792, 793, 794, 795, 271, 279, 797, 798, 293

[56] References Cited

U.S. PATENT DOCUMENTS

| | | | |
|---|---|---|---|
| 550,979 | 12/1895 | Kohlmeyer | 210/257.1 |
| 647,780 | 4/1900 | Wilson | 210/279 |
| 895,198 | 8/1908 | Reisert | 210/274 |
| 2,084,659 | 6/1937 | Streander | 210/275 |
| 2,239,612 | 4/1941 | Lawlor | 210/257.1 |
| 2,268,076 | 12/1941 | Lawlor | 210/257.1 |
| 2,559,784 | 7/1951 | Moore | 210/275 |
| 3,312,348 | 4/1967 | Greenleaf, Jr. | 210/264 |
| 3,473,661 | 10/1969 | Duff | 210/265 |
| 3,478,880 | 11/1969 | Harris | 210/794 |
| 3,545,619 | 12/1970 | Ettlich | 210/265 |
| 3,713,543 | 1/1973 | Heaney | 210/794 |
| 4,118,322 | 10/1978 | San Roman | 210/274 |
| 4,478,726 | 10/1984 | Moore | 210/274 |
| 4,484,728 | 11/1984 | Moore | 251/294 |
| 4,514,303 | 4/1985 | Moore | 210/521 |
| 5,032,294 | 7/1991 | Schulz | 210/279 |
| 5,137,645 | 8/1992 | Miller | 210/793 |
| 5,288,399 | 2/1994 | Schultz | 210/275 |
| 5,320,750 | 6/1994 | Krofta | 210/221.2 |

*Primary Examiner*—Cynthia L. Nessler

[57] ABSTRACT

A rapid gravity downflow filtration system applicable to a bank of several filters in which filtered water for backwashing is stored at a relatively high level in a common washwater storage compartment serving all filters and in which the filtered water for backwashing is delivered to it's storage by gravity using the surplus operating head available at the beginning of the filter operating cycle for the purpose thereby entirely eliminating the necessity for powered motivation of backwash water flow during backwashing, or, in alternative filter systems in which the backwash water flow is motivated by displacement with compressed air, reducing the power requirement.

14 Claims, 5 Drawing Sheets

RAPID GRAVITY FILTER BACKWASH SYSTEM AND FILTERS RELATIVE THERETO

FIELD OF INVENTION

This invention relates to the backwashing of particle filters. The particles of the filter or in other words the filter "bed" through which the liquid being filtered passes downward, retains impurities which accumulate causing the filter bed to become choked or blocked and before the filtering process can continue the impurities have to be removed by flushing to waste. This normally is effected by reversing the liquid flow through the filter and this is termed "backwashing" and this, in potable water filtration plants, should be effected by the utilization of filtered water. The invention specifically relates to banks of several open rapid gravity filters.

DESCRIPTION OF THE PRIOR ART

Generally heretofore apart from a design that employs a syphon to motivate the backwash water and individually stores its own backwash water supply above the filter bed, there have been two basic methods for motivating filtered backwash water to an open type rapid gravity filter—either by means of a pump from a reservoir into which the filtered water is delivered after filtration or by gravity from a filtered water reservoir located above the filter and to which the filtered water has been pumped. In all these cases a certain operating head is provided to motivate gravity filtration, Immediately after backwashing, when the filter bed is clean, a minimum portion of this head is only required to cause the water to pass through the filter bed and the balance of the head is normally destroyed in the filter control system which automatically makes more of the operating head available for filtration as the filter accumulates impurities.

A basic aspect of the present invention is the utilization of surplus operating head available in the early stages of a filter run to store backwash water at a higher level so that in backwashing, in one filter arrangement of the invention no pumping or syphon is required at all and in other filter arrangements the required pumping head is reduced and the system to provide backwashing, simplified.

A further aspect of the invention is to use this available filter operating head to provide storage of washwater at a relatively high level in relation to the filter bed than would be the case if operating filter head were not used for the purpose and also to provide a common system of washwater storage at this level in which a bank of a number of filters are jointly served by this storage.

It should be mentioned that where the term water is used in this application this could refer to any filterable liquid.

The subject of this invention relates specifically to the means and method by which filtered water for backwashing is obtained, stored, made available and delivered for the purpose to the filter bed and the ways that, utilizing the basic concepts of the invention, filters may be constructed and operated to suit.

SUMMARY OF THE INVENTION

Two basic examples are described in the invention and for identification and clarity have been designated types 1 and 2. Both filters are of the rapid gravity down flow type with type 1 filter being of the low bed type in which the filter bed is located well below the operating surface of the liquid above the filter bed and the invention provides for the motivation of backslash water without any power whatsoever (for free). Type 2 filters are of the high bed type in which the filter bed is located relatively near the operating surface of the liquid above the filter and the invention as well as facilitating advantageous filter type structure, reduces the power necessary for backwash water motivation. According to the invention filtered backwash water is obtained directly from the filtered water delivery of an open rapid gravity filter in the early stages of a filter "run" after backwashing, the filtered water delivery defining a first filtrate liquid, utilizing the operating head of the filter available at this period in the filter 'run" to store at a relatively higher level, filtered washwater in a common washwater storage compartment serving a bank or a number of filters individually with backwash water supply.

In the first example, a rapid gravity filter in which the water level is lowered for backwashing according to the invention would have an inlet for water to be filtered to an open filter chamber at a low level of which a particle filter bed is located on a filtered water collecting and backwash water distribution system connecting to a filtered water outlet and a backwash water inlet from a common wash water storage compartment serving several filters and located at a level to which filtered water can gravitate at the early stages of a filter fun and from which wash water will gravitate to backwash the filter when the water level above the filter is lowered for backwashing purposes, a wash water outlet being provided at a lower level.

The normal filtering operation of the above filter consists of admitting water to be filtered (through an isolating inlet) to the body of water above the filter, passing the water through the filter bed in a downward direction, collecting the filtered water below the filter bed and delivering this via a conduit and regulating outlet valve that controls the rate of flow, maintains the level of water above the bed and compensates for loss of head as the resistance to flow through the filter builds up with accumulated impurities.

Backwashing of the filter, necessary with the accumulation of impurities in the filter bed and delivery of filtered water to backwash water storage at the requisite level is as follows.

The filter inlet is closed and the water above the bed is drawn down to wash level either by opening the wash water outlet valve or allowing the filter to draw down before closing the filtered water outlet which is then closed and the wash water outlet valve opened.

Air agitation of the filter bed is then preferably effected by admitting compressed air to the filter distribution system below the filter bed. After air agitation filtered water from the common wash water storage compartment is delivered to the distribution system below the filter bed by opening the relevant backwash valve causing a reverse flow of water through the filter bed and carrying the accumulated impurities to waste. The wash water (waste) outlet valve is then Closed and the filter inlet valve opened filling the filter chamber and causing water to pass through the filter and into the common wash water storage compartment via the backwash valve which remains open until the wash water storage compartment is filled to the required level when the backwash valve connecting the filtered water conduit to the wash water storage compartment is closed and the filter outlet controller activated to cause the filter to resume normal filtering duty. All backwash valves connecting the common wash water storage compartment to all the other filters also remain closed until the valve to the relevant filter is opened for backwashing purposes, the filters being backwashed individually in sequence or as required.

The filtered water routed to the washwater storage chamber may be via a large enough conduit to serve the dual purpose of also permitting the high backwash return flow in which case this conduit may terminate in a vertically slidable section that performs the dual function of an overflow weir inlet to the washwater chamber and a washwater outlet valve or control when it is lifted off the end of the delivery conduit at washwater chamber floor level and permits washwater flow and seals the washwater outlet when lowered. Separate conduit and valved means may of course be provided instead of a common conduit, or single controlled valve means.

The common washwater chamber would have sufficient storage to wash at least one filter and to this end the chamber may span the length of a bank of filters each of which would have an inlet and washwater connection thereto which could be of a dual duty type described above.

TYPE 1 FILTER

Figure 1:
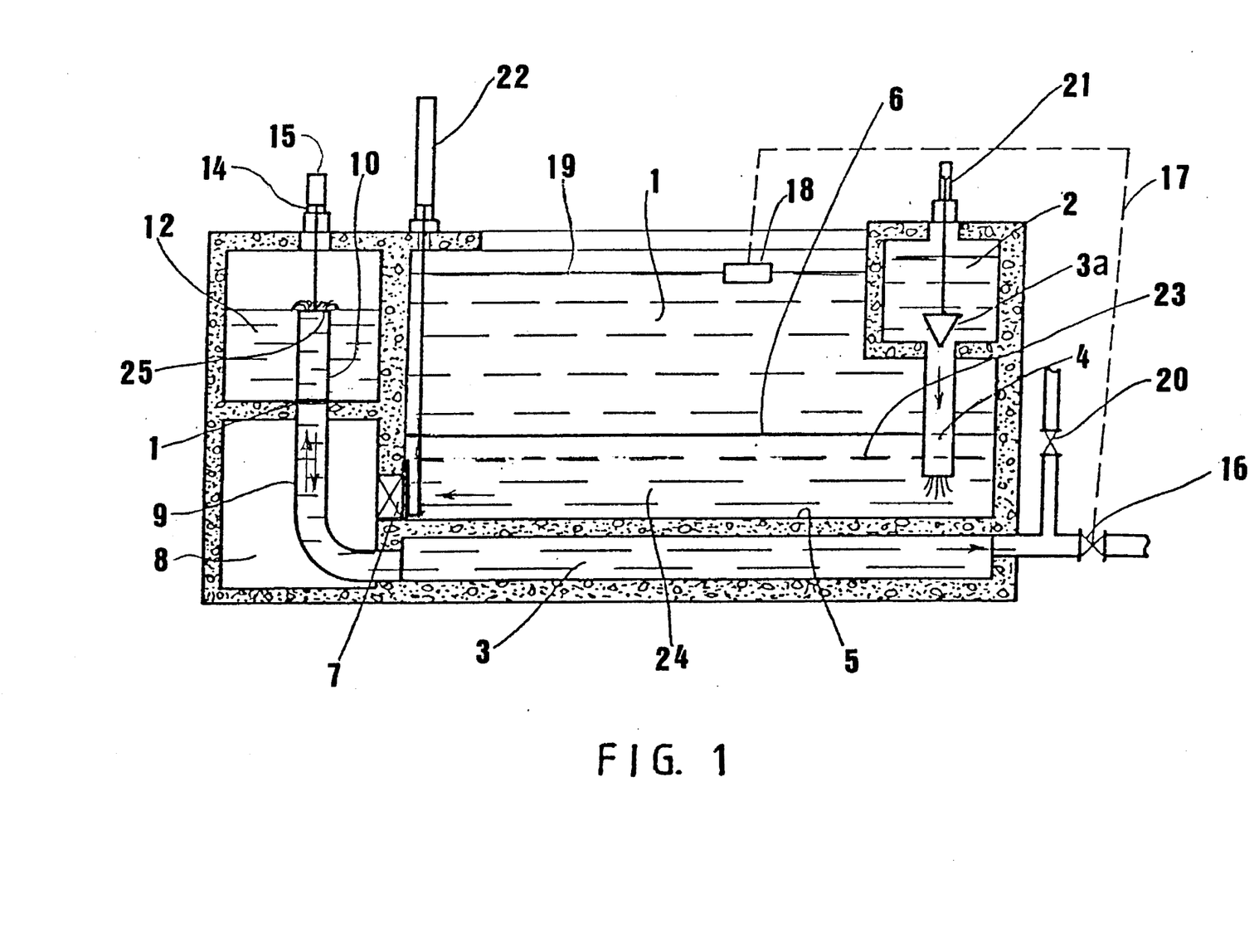
FIG. 1 is a cross-sectional view of a first embodiment of a Type 1 filter in accordance with the invention.

FIG. 1 indicates in cross-section an example of Type 1 filter of the invention in which the washwater storage chamber 12 is located on the far side of the filter—that is the opposite side from which the control gallery is located and the section has been taken to best indicate function, through the washwater receiving trough 24 with its floor level at 5, and the filtered water duct 3 to which the filter bed underflow distribution system connects, below. 23 Is the top of the filter bed behind the wash water trough wall 24 with overflow wash sill at 6. 7 Is the washwater outlet valve which is shown as a Moore Rolling Seal penstock (U.S. Pat. No. 4,484,728) power motivated by cylinder 22 and discharged into washwater drain channel 8. 1 is the filter chamber with operating water Level at 19. 2 is the channel feeding water to be filtered through inlet valve 3a also shown power motivated at 21 and discharging through conduit 4 into wash water trough 24. 9 Is the conduit connecting to filtered water duct 3 and delivering filtered water by gravity (the difference between levels 19 and 25) via overflow 25 to fill washwater storage chamber 12.

When backwashing is required, filter inlet valve 3a is closed and filter water level 19 is allowed to drop to washwater trough sill level 6 and trough drain penstock 7 is then opened and filter outlet valve 16 is closed. The filter bed is then preferably agitated by air via air supply isolating valve 20. After air agitation valve 20 is closed separate section 10 of conduit 9 is raised allowing stored washwater to exit at 11 and flow down conduit 9 to backwash the filter bed and over flow washwater discharge sill 6 to be routed to waste via penstock 7.

At the completion of backwashing, section 10 is lowered sealing stored washwater outlet 11, penstock 7 is closed and filter inlet valve 3 is then opened filling the filter chamber until filtered water overflows 25 and fills the wash water storage chamber 12 when filter outlet controller 16 is then activated.

It should be mentioned that by creating what amounts to a valve by having separate conduit section 10 has the considerable advantage apart from cost saving, that the "valve" is not subject to differential forces when closed and its required opening force is therefore limited to overcoming only the weight of section 10 or the weight of the conduit closure member.

Figure 2:
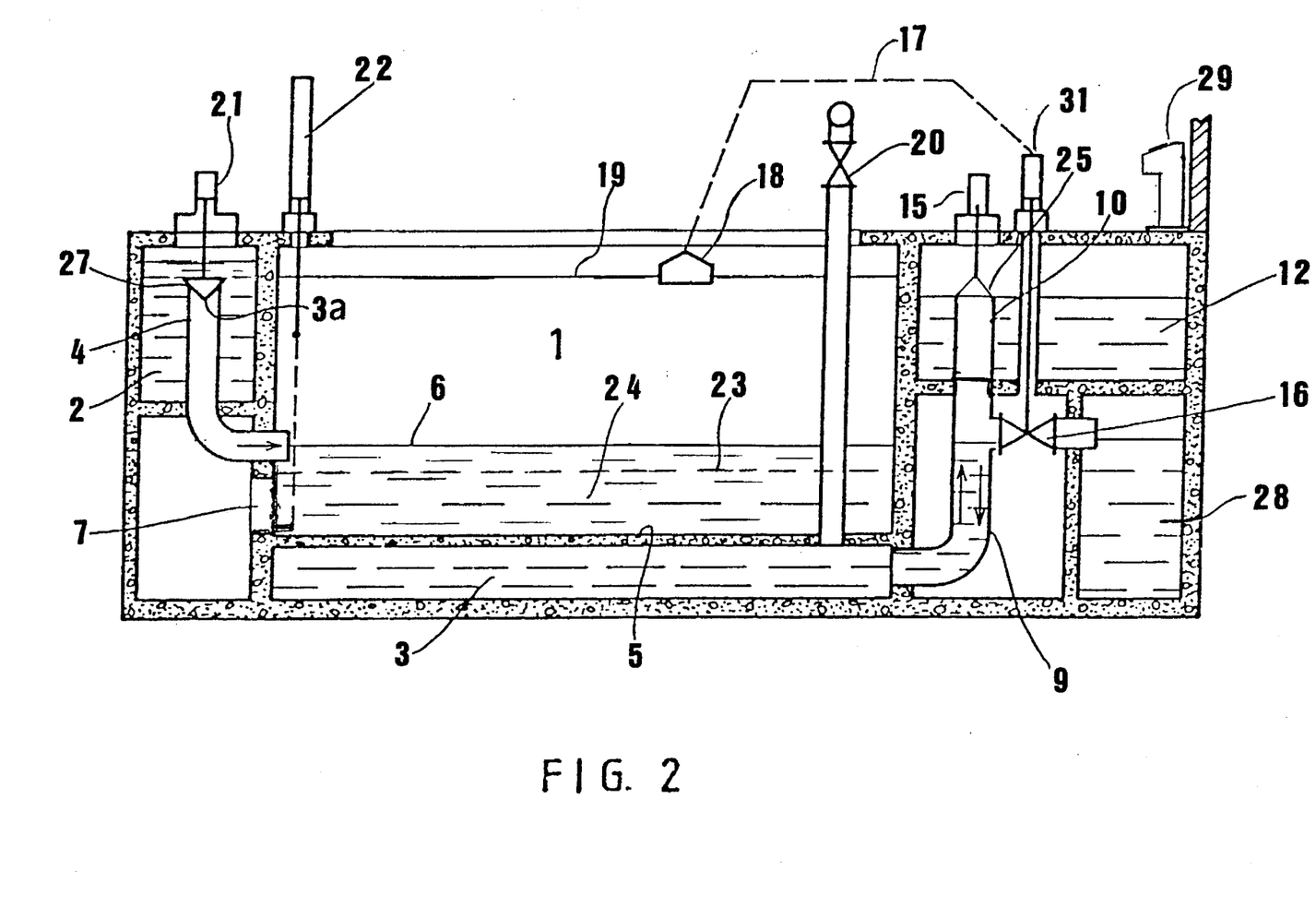
FIG. 2 is a cross-sectional view of a second embodiment of the Type 1 filter in accordance with the invention.

FIG. 2 shows a similar cross-sectional view of a different example of Type 1 filter of the invention in which the washwater storage chamber 12 is located below the filter inspection/control gallery and again this washwater storage chamber may extend the full length of a bank of filters. FIG. 2 also shows a different control technique in that the water to be filtered in channel 2 enters the filter over a circular weir 27 at the top of inlet pipe 4 shown isolated by closure member 3a with the filter shown drained down for backwashing.

When open, inlet weir 27 controls the flow into the filter, so that the flow to a bank of filters would be equally divided between all filters, the operating water level, 19, of which is automatically controlled by filter outlet valve 16, a predetermined distance below the water level of filter inlet launder 2.

After backwashing, when filter inlet isolator 3a is opened, valve 16 remains closed until washwater storage chamber 12 is filled before being activated for normal filtration to recommence. Other identification numbers in FIG. 2 are as designated in Fig i except for 28, a filtered water delivery channel, 31 indicating diagramatically an operating control for valve 16 and 29 indicating a filter control console.

DESCRIPTION OF THE PREFERRED EMBODIMENT OF TYPE 2 FILTER

The foregoing is an example of a type of filter of the invention in which the storage and motivation of the backwash water when backwashing a rapid gravity filter does not require any additional motive power other than that available from the operating head of the filter.

The following is an example of a filter of the invention in which no additional motive power is required for storing the washwater, i.e., the motive power is by gravity only, but motive power on a reduced scale is required to motive the backwash water when backwashing and which is motivated by displacement with compressed air from a common enclosed washwater storage compartment.

In this type of filter the filter bed is located at a high level and the water level is raised in the backwashing operation.

Elements of a preferred embodiment of this filter of the invention include the following:

1. The filter bed is located at a high level.
2. The water level is raised when backwashing.
3. The filter has no washwater outlet valve, the expended washwater overflowing a weir exit.
4. An inlet valve or means is provided.
5. There is a minimum depth of water above the filter bed.
6. Means such as an intermediate channel is provided to distribute the incoming water so that it does not disturb the filter bed.

7. A filtered water collecting and washwater distributing system is provided below the filter with main conduit means connected thereto for delivering filtered water or supplying backwash water.
8. The filter bed is agitated with air prior to backwashing.
9. Backwash water is stored at a specific level in a common compartment serving several filters and using the operating head of the filter for the purpose.
10. Backwash water is motivated by displacement with compressed air using the same compressor that supplies agitating air to the filter bed.
11. The common backwash water storage compartment is enclosed so that entering air will displace washwater.
12. A compressor is provided to supply compressed air for agitation or for displacing washwater and valved means are provided to determine the duty.
13. Each of the bank of filters has a valved connection to the common washwater storage compartment that is opened and remains open to admit filtered water to the compartment after backwashing until the washwater storage compartment is full, and is only reopened to allow the passage of washwater for backwashing purposes.
14. A valve to vent displacing air from the washwater storage compartment after backwashing is provided.
15. The air venting valve or valves may also serve the purpose of controlling the rate of entry of filtered water to the washwater compartment and incidentally the rate of filtration at this time, where a secondary smaller valve may provide "slow start", initially.
16. The filter will have a filtered water outlet valve or controller.
17. The bank of filters will have means to divide the incoming flow equally between all filters.
18. The backwash water storage compartment would have at least sufficient washwater storage capacity to backwash one filter.
19. The backwash water storage compartment may incorporate means to prevent the water level in the compartment being drawn down too low when backwashing to prevent displacing air entering the filter distribution system.
20. As a safty feature the enclosed backwash water storage compartment may also have means to automatically vent excess pressure over and above that required to motivate backwashing.

TYPE TWO FILTER DRAWINGS

Figure 3:
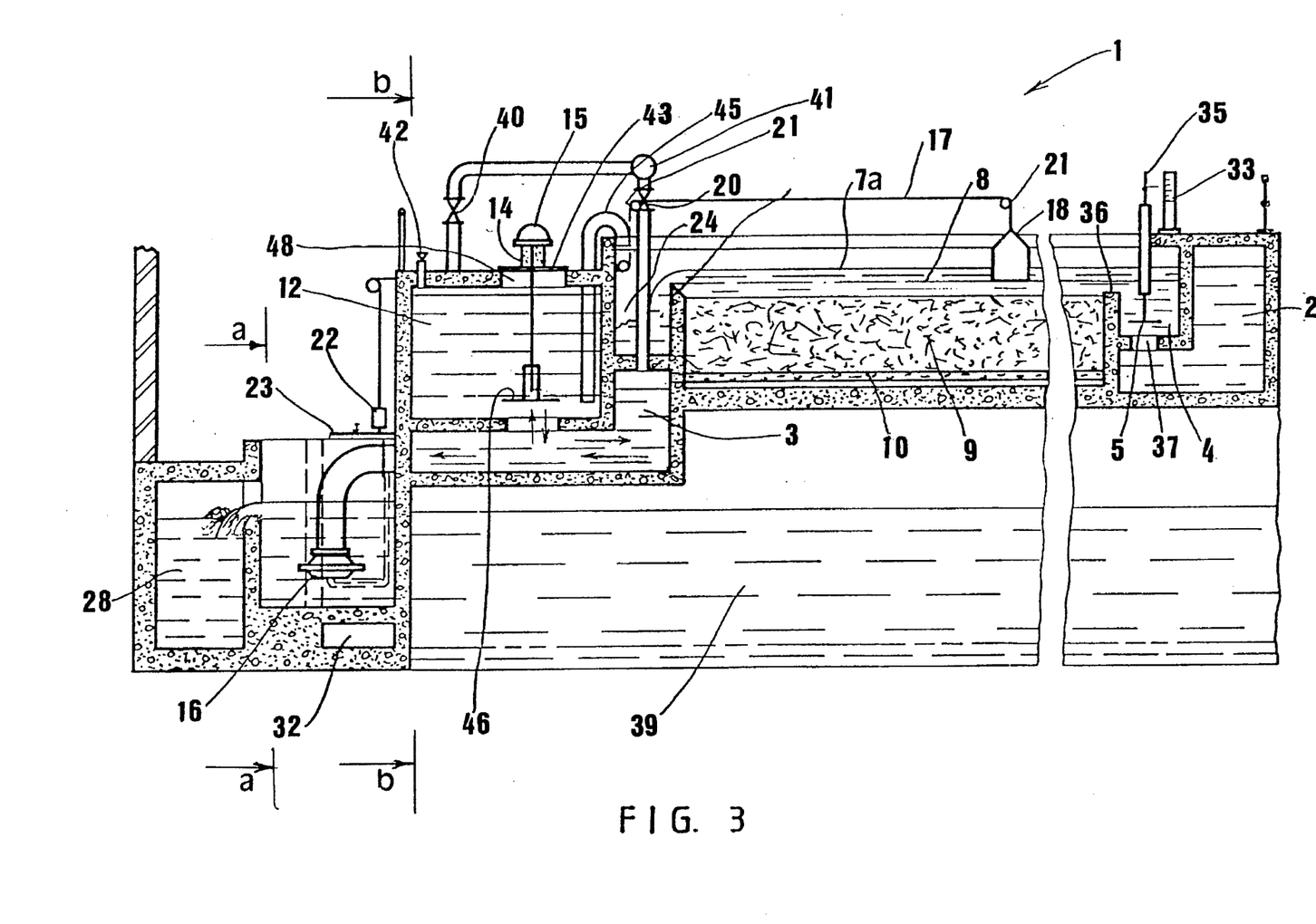
FIG. 3 is a cross-sectional view of a Type 2 filter in accordance with the invention.
Figure 4:
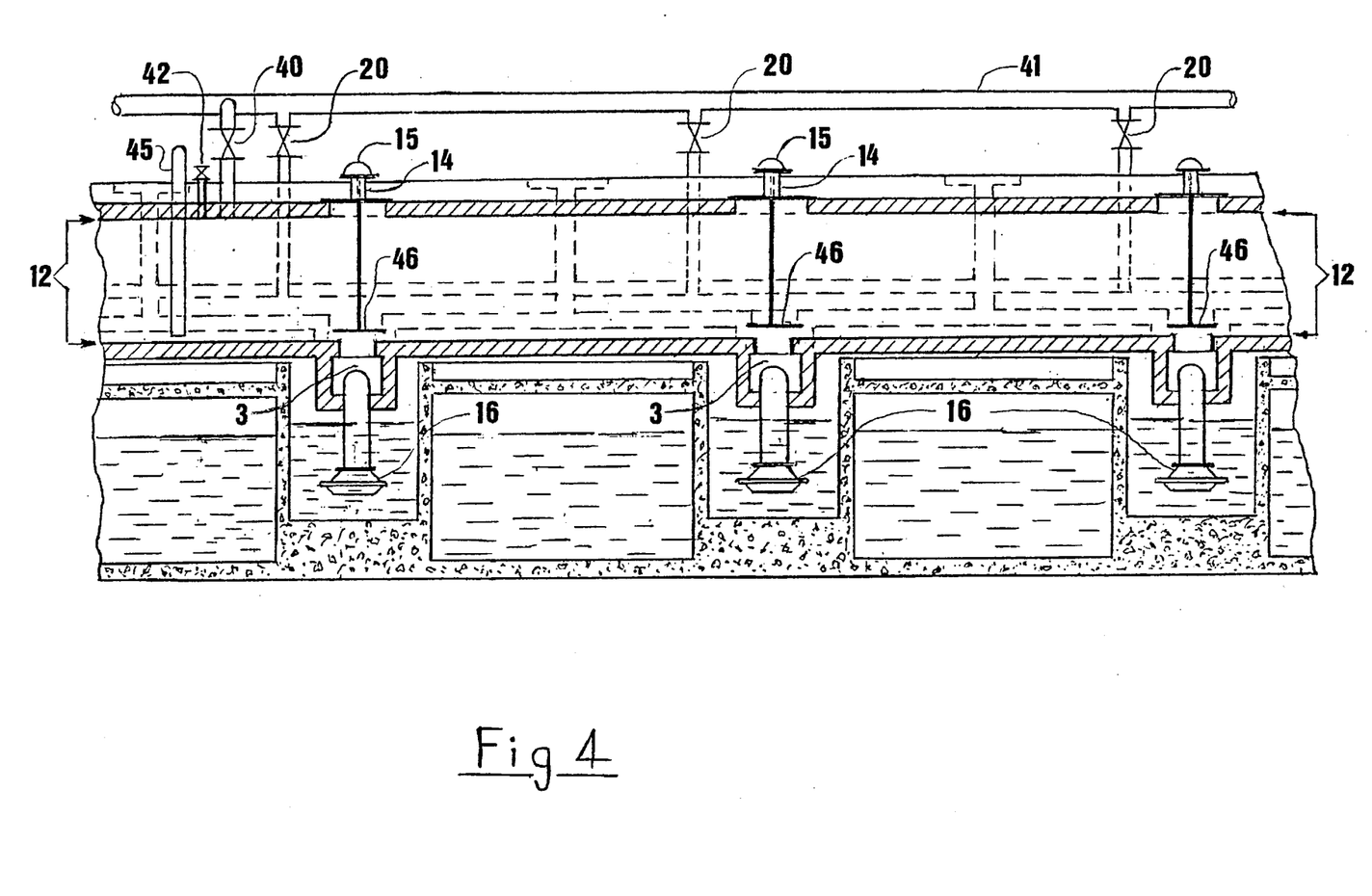
FIG. 4 is another cross-sectional view of the filter of FIG. 3.

FIGS. 3 and 4(sheet 3 and 4) have been prepared to illustrate preferred forms of type 2 filter of the invention.

FIG. 3 is a cross-section through an example of the type two filter of the invention in which the filter bed is located at a high level and in which the section is taken to illustrate the flow path through the filter both when producing filtered water and when being backwashed.

FIG. 4 is a stepped front elevation of the filter illustrated in FIG. 3 with the first sectional front elevation taken through the filter outlet boxes and the second stepped back sectional elevation taken through the wash water compartment, designated by hatching, and illustrating how the wash water compartment extends along a bank of filters the structures of which are dotted in the background The illustrations illustrate a functional arrangement of the invention but are not intended to limit the structural arrangement.

In these FIGS. 1 is the filter compartment, 2 the filter feed launder, 3 the filtered water delivery duct, 4 the intermediate inlet channel that disperses the inlet flow to the filter over wall 36, 5 is a non return inlet valve that floats on the incoming flow and can also serve to indicate the incoming flow at 33 by the amount that 35, attached to the valve shaft is lifted. This information may be transmitted for remote flow indication or integration. Since the inlet valve may close automatically for washing, power,or automated closure is not essential as the valve only needs to be manually closed when it is necessary to isolate a filter.

Manual closure may be effected simply by placing a special weight on the valve spindle and small weights placed thereon may be used to adjust flow or the differential that passes a specific flow. Normally since inlet valve throat 37 is the same size for all filters in a block and differential and other inlet characteristics are similar, the incoming flow to all filters is equal but the above feature does provide means to fine tune if necessary.

The setting of the filter operating top water level 8 is a further means of adjusting flow but this should preferably be the same for all filters and is automatically maintained by float 18 controlling filter outlet valve 16 via line 17, pulleys 21 counter weight 22, and pilot valve 23 so that in normal operation the outgoing flow from the filter matches the incoming flow with the level of the liquid 8 above the filter automatically maintained within close limits. In backwashing this level is raised (7a).

The particle filter bed 9, rests on distributing filter "floor" 10 that connects into filtered water duct 3, that has a branch connection into wash water storage compartment 12, isolated by valve 46, that is shown, motivated by pressure to close dome 15, acting against opening spring 14. 43 Is a mounting plate for the valve operator and also serves as a cover plate for manhole 48 that is of sufficient diameter to permit valve closure disc 46 to be extracted. Valve closure disc 46 has guides (not shown) that engage the valve throat. Valve discs 46 and 5 may be flexibly connected to their spindles to provide automatic alignment on closure.

41 is the air main that delivers compressed air from a filter blower and delivers this via valve 20 for filter bed agitation purposes or via valve 40 for wash water displacement purposes.

42 Is a valve isolating the air exhaust vent from compartment 12. 45 Is a pressure relief pipe from compartment 12 and discharges into filter wash water outlet channel 24. 28 Is a receiving channel for filtered water, 32 a drain duct and 39 indicates the possible location of a filtered water storage reservoir below the filter block.

MODIFIED TYPE 2 FILTER FOR SMALL INSTALLATIONS

Figure 5:
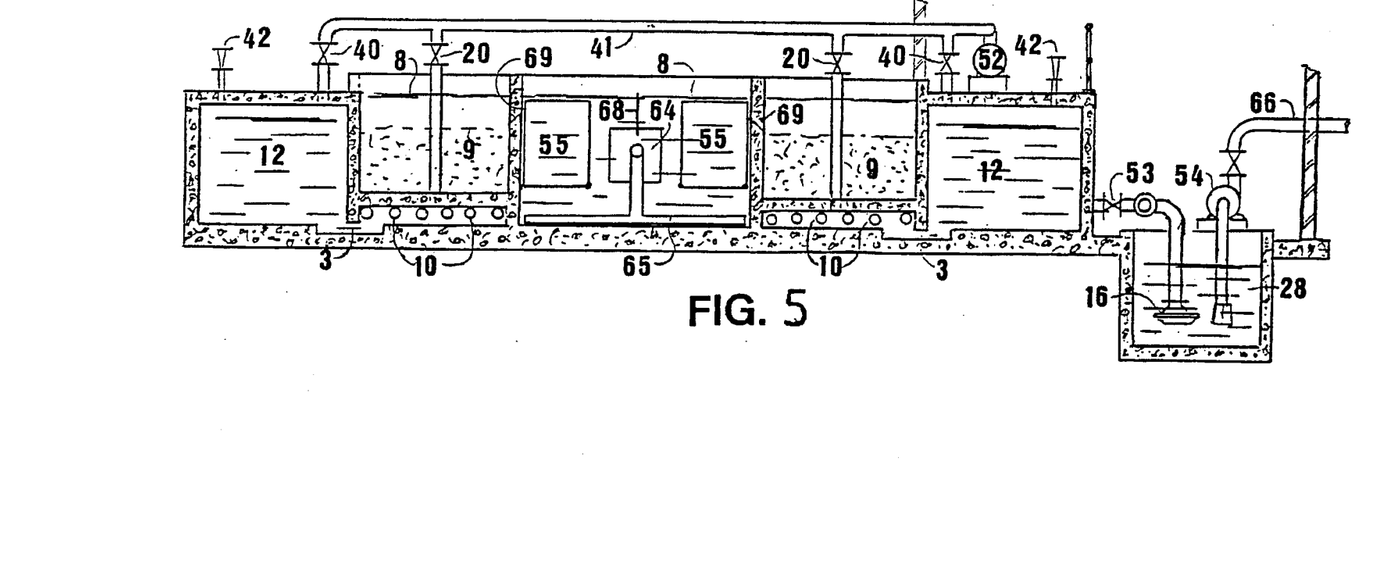
FIG. 5 is a cross-sectional view of a modified Type 2 filter in accordance with the invention, suitable for smaller installations.
Figure 5A:
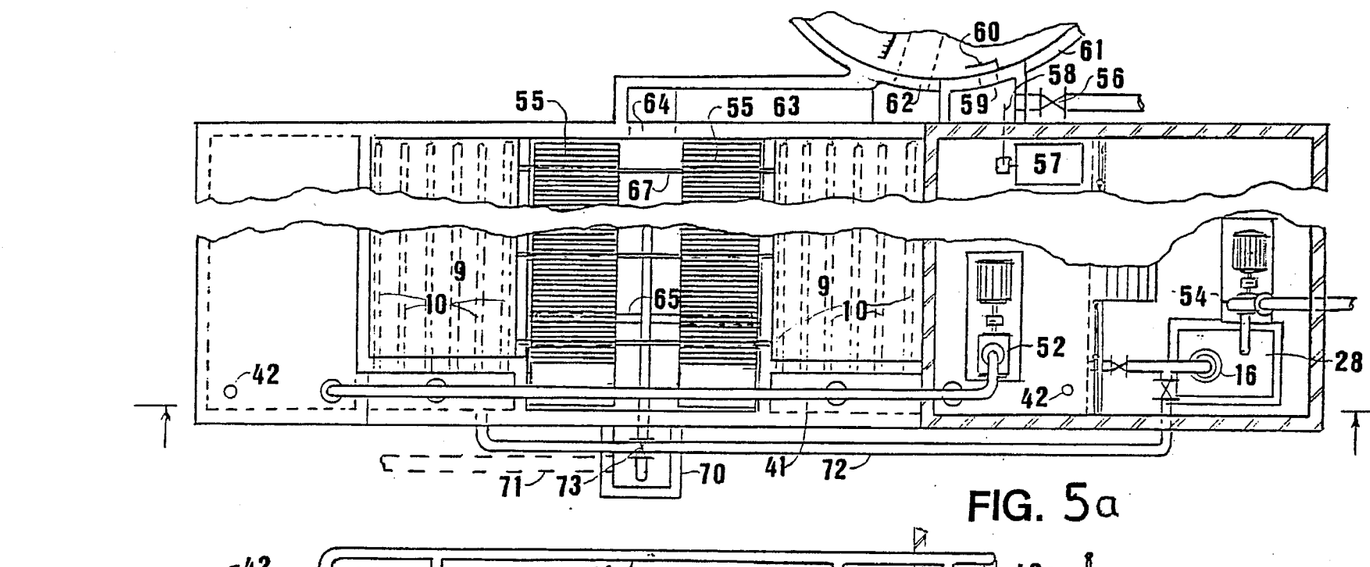
FIG. 5a is a plan view of the filter of FIG. 5.

In a modification of the type 2 filter principle, FIGS. 5 and 5a (sheet 5) have been prepared in vertical section and plan respectively to illustrate the invention's concept in a special arrangement suitable for the smaller installation and in which the invention is combined with the inventors inclined sheet settling system and deminishing intensity conditioning system to illustrate a complete small water works layout as shown in FIG. 5a (sheet 5) in which 56 is a raw water inlet valve delivering raw water that receives a coagulating chemical dose at 58 from chemical feeder 57 the chemicated raw water entering deminishing intensity conditioning system at 59 to be circumferentially deflected by 60. After being very efficiently conditioned, the flocculated water exits from deminishing intensity conditioning system 61 at 62, flows along inspection channel 63, and enters an inclined sheet settling system at 64. The preconditioned water in which turbidity and suspended impurities are flock bound, then passes through elongated rows of inclined sheets where the settleable impurities are removed and the settled water passes on to the filter beds 9, and out through the filter "floor" collecting system 10 and into the filtered water delivery duct 3 and into filtered water backwash storage compartment 12, which again is located at the same height as the filter but is located at the side of the filter.

Filtered water passes through compartment 12 or is conducted from duct 3 by conduit 72, passes through isolating valves 53 and discharges via float controlled valve 16 into filtered water chamber 28 from where it may be pumped by 54 and delivered by 66 to filtered water storage. Blower 52 produces compressed air into conduit 41 which feeds branch with valve 20 for filter bed agitation or valve 40 for backwash water displacement. Non return valve 42 vents air from compartment 12. 65 Is an automatic desludge system separately covered, that removes settled material from the floor of the settling system and delivers this via valve 73 to drain box 70 with conduit drain 71. 67 is a relatively small support member that spans settled water system outlet weirs 69 and from which the inclined sheets depend.

It would be noted that in this special instance backwash water exits from the filter directly into the settling system and is deflected at 68 from travelling completely across the settling system. Also in this instance each filter has its own backwash water storage compartment so that no duct valve is required to control the entry and exit of filtered water which is displaced merely by admitting compressed air through valve 40 and air is automatically exhausted from the compartment through non-return valve 42.

The rate of flow through the purification plant may be readily controlled in accordance with the capacity of the filtered water pump 54 by making valve 16 paced by the water level of filtered water chamber 28 and the raw water inlet valve 56 in turn paced by the water level of the main containing strucure. Backwashing may be readily automated to coincide with automated desludging.

I claim:

1. A liquid filtration system comprising:

a vessel;

a means for dividing said vessel into a plurality of filter chambers;

an underbed collecting/distribution means disposed in each of said plurality of filter chambers for removing filtered liquid therefrom and for delivering compressed air and backwash liquid thereto;

a bed of filter media supported on each said underbed collecting/distribution means;

a waste backwash liquid outlet means disposed above each said filter media bed for directing waste backwash liquid to drain;

inlet means fluidly connected to each of said plurality of filter chambers for introducing liquid to be filtered;

filtered liquid outlet means fluidly connected to each said underbed collecting/distribution means for discharging filtered liquid therefrom, said filtered liquid outlet means having filtered liquid outlet valve means for controlling the flow of filtered liquid through said filtered liquid outlet means;

wherein said vessel further comprises a common backwash liquid storage chamber and at least one conduit means fluidly connecting said common backwash liquid storage chamber with each of said underbed collecting/distribution means, said common backwash liquid storage chamber defining means for storing a first filtrate liquid, said stored first filtrate liquid having been filtered at the beginning of a filter run, said stored first filtrate liquid being of a quantity sufficient to backwash at least one said filter media bed, said common backwash liquid storage chamber being disposed above the level of said waste backwash liquid outlet means and above the level of said filtered liquid outlet means for permitting, during backwashing, a gravity flow of said stored first filtrate liquid from said common backwash liquid storage chamber through said at least one conduit means to at least one of said plurality of filter chambers and through said filter media bed supported therein in a reverse direction relative to the flow of unfiltered liquid therethrough;

said at least one conduit means further defining means for directing a gravity flow of said first filtrate liquid into said common backwash liquid storage chamber at the beginning of a filter run; and, said common backwash liquid storage chamber further having at least one backwash liquid valve means for admitting said gravity flow of said first filtrate liquid from said at least one conduit means and for discharging said gravity flow of said stored first filtrate liquid to said at least one conduit means.

2. The system of claim 1, wherein said common backwash liquid storage chamber has at least one opening, each said at least one opening receiving an open terminal end of one of said at least one conduit means, and wherein each said at least one backwash liquid valve means is disposed within said common backwash liquid storage chamber and comprises a vertically slidable conduit, said vertically slidable conduit matingly engaging said open terminal end, each said at least one backwash liquid valve means further having means for raising and lowering said vertically slidable conduit;

each said at least one backwash liquid valve means defining, when said vertically slidable conduit is lowered, both a weir means for receiving overflow from said common backwash liquid storage chamber and a retaining means for retaining said quantity of said stored first filtrate liquid within said common backwash liquid storage chamber; and each said at least one backwash liquid valve means further defining means for permitting said gravity flow of said quantity of said stored first filtrate liquid through said at least one conduit means when said vertically slidable conduit is raised.

3. The system of claim 2, wherein said filtered liquid outlet valve means further comprise float control valve means for controlling the flow of filtered liquid through said filtered liquid outlet means in response to the liquid level in each of said plurality of chambers.

4. The system of claim 1, wherein said vessel is an open water-containing structure disposed within the ground.

5. A liquid filtration system comprising:

a vessel;

a means for dividing said vessel into a plurality of filter chambers;

an underbed collecting/distribution means disposed in each of said plurality of filter chambers for removing filtered liquid therefrom and for delivering compressed air and backwash liquid thereto;

a bed of filter media supported on each said underbed collecting/distribution means;

a waste backwash liquid outlet means disposed above each said filter media bed for directing waste backwash liquid to drain;

inlet means fluidly connected to each of said plurality of filter chambers for introducing liquid to be filtered;

filtered liquid outlet means fluidly connected to each said underbed collecting/distribution means for discharging filtered liquid therefrom, said filtered liquid outlet means having filtered liquid outlet valve means disposed therein for controlling the flow of filtered liquid through said filtered liquid outlet means;

wherein said vessel further comprises an enclosed common backwash liquid storage chamber and at least one conduit means fluidly connecting said enclosed common backwash liquid storage chamber with each said underbed collecting/distribution means, said enclosed common backwash liquid storage chamber defining means for storing a first filtrate liquid, said stored first filtrate liquid having been filtered at the beginning of a filter run, said stored first filtrate liquid being of a quantity sufficient to backwash at least one said filter media bed, said vessel further comprising a source of compressed air connected to said enclosed common backwash liquid storage chamber, said enclosed common backwash liquid storage chamber being disposed within the operating head of said plurality of filter chambers above the level of said filtered liquid outlet means, said compressed air defining means for directing, during backwashing, said stored first filtrate liquid from said enclosed common backwash liquid storage chamber through said at least one conduit means to at least one of said plurality of filter chambers and through said filter media bed supported therein in a reverse direction relative to the flow of unfiltered liquid therethrough;

said at least one conduit means further defining means for directing a gravity flow of said first filtrate liquid into said enclosed common backwash liquid storage chamber at the beginning of a filter run; and, said enclosed common backwash liquid storage chamber further having vent valve means for venting air therefrom and at least one backwash liquid valve means for admitting said gravity flow of said first filtrate liquid from said at least one conduit means and for discharging said stored first filtrate liquid to said least one conduit means.

6. The system of claim 5, wherein said source of compressed air is further connected to each said underbed collecting/distribution means for delivering said compressed air thereto.

7. The system of claim 6, wherein said filtered liquid outlet valve means further comprise float control valve means for controlling the flow of filtered liquid through said filtered liquid outlet means in response to the liquid level in each of said plurality of chambers.

8. The system of claim 5, wherein said vessel is an open water-containing structure disposed within the ground.

9. A process for filtering impurities from a liquid using a liquid filtration system, the system comprising a vessel, a means for dividing said vessel into a plurality of filter chambers, an underbed collecting/distribution means disposed in each of said plurality of filter chambers for removing filtered liquid therefrom and for delivering backwash liquid thereto, a bed of filter media supported on each said underbed collecting/distribution means, a waste backwash liquid outlet means disposed above each said filter media bed for directing waste backwash liquid to drain, inlet means fluidly connected to each of said plurality of filter chambers for introducing liquid to be filtered, filtered liquid outlet means fluidly connected to each said underbed collecting/distribution means for discharging filtered liquid therefrom; said vessel further comprising a common backwash liquid storage chamber disposed above the level of said waste backwash liquid outlet means and above the level of said filtered liquid outlet means, and at least one conduit means fluidly connecting said common backwash liquid storage chamber with each of said plurality of filter chambers; the process comprising the following steps:

(a) passing liquid containing impurities through each said filter media bed in a downward direction to said filtered liquid outlet means wherein said impurities are accumulated in each said filter media bed and a liquid level is maintained above each said filter media bed;

(b) after accumulating said impurities, draining said liquid level in at least one of said plurality of chambers to a wash level located above said filter media bed supported therein and below said liquid level;

(c) introducing a gravity flow of stored first filtrate liquid from said common backwash liquid storage chamber through said filter media bed in an upward direction, said stored first filtrate liquid carrying said accumulated impurities to drain through said waste backwash liquid outlet means, thereby creating a backwashed filter media bed;

(d) terminating said gravity flow of said stored first filtrate liquid through said backwashed filter media bed;

(e) passing liquid to be filtered through said backwashed filter media bed in a downward direction, thereby creating a first filtrate liquid;

(f) passing a gravity flow of said first filtrate liquid to said common backwash liquid storage chamber until a quantity of said first filtrate liquid sufficient to backwash at least one of said filter media beds is stored in said common backwash liquid storage chamber, thereby creating stored first filtrate liquid;

(g) terminating said gravity flow of said first filtrate liquid to said common backwash liquid storage chamber;

(h) passing liquid to be filtered through said backwashed filter media bed in a downward direction to said filtered liquid outlet means wherein said impurities are accumulated in said backwashed filter media bed and liquid level is maintained above said backwashed filter media bed; and (i) repeating steps (a)–(i).

10. The process of claim 9, wherein said underbed collecting/distribution means disposed in each of said plurality of chambers further defines means for delivering compressed air thereto, and wherein the process further includes, after step (b) but before step (c), the following steps:

admitting a flow of said compressed air through said underbed collecting/distribution means into said filter media bed in an upward direction, wherein said filter media bed is agitated by said compressed air; and terminating said flow of said compressed air.

11. The process of claim 9, wherein said vessel is an open water-containing structure disposed within the ground.

12. A process for filtering impurities from a liquid using a liquid filtration system, the system comprising a vessel, a means for dividing said vessel into a plurality of filter chambers, an underbed collecting/distribution means disposed in each of said plurality of filter chambers for removing filtered liquid therefrom and for delivering backwash liquid thereto, a bed of filter media supported on each said underbed collecting/distribution means, a waste backwash liquid outlet means disposed above each said filter media bed and above an operating level of the liquid above each said filter media bed during filtration for directing waste backwash liquid to drain, inlet means fluidly connected to each of said plurality of filter chambers for introducing liquid to be filtered, filtered liquid outlet means fluidly connected to each said underbed collecting/distribution means for discharging filtered liquid therefrom, said filtered liquid outlet means having filtered liquid outlet valve means disposed therein for controlling the flow of said filtered liquid through said filtered liquid outlet means; said vessel further comprising an enclosed common backwash liquid storage chamber disposed above the level of said filtered liquid outlet means and within said operating liquid level above each said filter media bed, means for supplying compressed air to said enclosed common backwash liquid storage chamber, means for venting compressed air from said common backwash liquid storage chamber, and at least one valved conduit means fluidly connecting said enclosed common backwash liquid storage chamber with each of said plurality of filter chambers; the process comprising the following steps:

(a) passing liquid containing impurities through each said filter media bed in a downward direction to said filtered liquid outlet means wherein said impurities are accumulated in each said filter media bed and said operating liquid level is maintained above each said filter media bed;

(b) after accumulating said impurities, interrupting the flow of liquid to and from at least one of said plurality of filter chambers;

(c) initiating a flow of said compressed air into said enclosed common backwash liquid storage chamber thereby inducing by compressed air displacement a flow of stored first filtrate liquid from said enclosed common backwash liquid storage chamber through said filter media bed in an upward direction, said stored first filtrate liquid carrying said accumulated impurities to drain through said waste backwash liquid outlet means, thereby creating a backwashed filter media bed;

(d) terminating said flow of compressed air thereby terminating said flow of stored first filtrate liquid through said backwashed filter media bed;

(e) passing liquid to be filtered through said backwashed filter media bed in a downward direction, thereby creating a first filtrate liquid;

(f) passing a gravity flow of said first filtrate liquid to said enclosed common backwash liquid storage chamber while exhausting air therefrom, until a quantity of said first filtrate liquid sufficient to backwash at least one of said filter media beds is stored in said enclosed common backwash liquid storage chamber, thereby creating stored first filtrate liquid;

(g) terminating said gravity flow of said first filtrate liquid to said common backwash liquid storage chamber;

(h) passing liquid to be filtered through said backwashed filter media bed in a downward direction to said filtered liquid outlet means wherein said impurities are accumulated in said backwashed filter media bed and said liquid level is maintained above said backwashed filter media bed; and (i) repeating steps (a)–(i).

13. The process of claim 12, wherein said underbed collecting/distribution means disposed in each of said plurality of filter chambers is further connected to said compressed air supplying means, and wherein the process further includes, after step (b) but before step (c), the following steps:

admitting a flow of said compressed air from said compressed air supplying means through said underbed collecting/distribution means into said filter media bed in an upward direction, wherein said filter media bed is agitated by said compressed air; and terminating said flow of said compressed air.

14. The process of claim 12, wherein said vessel is an open water-containing structure disposed within the ground.

* * * * *